Aug. 21, 1928.

O. E. BUCKLEY

SUBMARINE CABLE

Filed July 31, 1925

1,681,515

Inventor:
Oliver E. Buckley
by E. W. Adams Atty.

Patented Aug. 21, 1928.

1,681,515

UNITED STATES PATENT OFFICE.

OLIVER E. BUCKLEY, OF MAPLEWOOD, NEW JERSEY, ASSIGNOR TO WESTERN ELECTRIC COMPANY, INCORPORATED, OF NEW YORK, N. Y., A CORPORATION OF NEW YORK.

SUBMARINE CABLE.

Application filed July 31, 1925. Serial No. 47,245.

This invention relates to electrical conductors and more particularly to the loading of electrical conductors, such as submarine cables.

In the continuous loading of cables, it is usual to surround the conductor with one or more layers of spirally wound wire or tape. This loading material may be any material having pronounced magnetic properties, such as iron or certain nickel-iron alloys. In Patent No. 1,586,875, granted to O. E. Buckley on June 1, 1926, a method of loading cables is described in which a protecting fluid is applied to the loaded conductor before it is covered with gutta percha and other insulating and armoring material. The protecting fluid referred to is viscous and as set forth in said copending application enters the interstices between the conductor and the loading material and between the layers of loading material themselves so that it equalizes any strain on the loading material which may occur due to distortion of the cable in handling or for any other reason, such as being subjected to intense pressure at the ocean bottom. Such a protecting fluid prevents undue stress or strain on the loading material which might in any way alter or impair its magnetic properties.

It has previously been proposed to apply successive layers of loading material in the form of oppositely wound spirals of wire or tape. However, it is difficult to secure proper protection against pressure effects with cable loaded with cross wound tape as the protecting fluid, being viscous encounters great resistance to flow through the small interstices where the tapes cross.

The principal objects of the invention are to provide an improved method of loading electrical conductors and to insure proper protection of the loading material to preserve its desirable property. In accordance with a feature of the invention, these objects are attained by applying the successive layers of loading material so as to provide unobstructed passages between the turns of loading material to permit easy access to the protecting fluid. Other objects and advantages of the invention will become apparent from the following description and drawing.

In the case of conductors having more than one layer of loading material and when cross wound with the second layer of tape, the interstices between the successive turns cross, leaving only very small apertures of a square or diamond shape through which the protecting fluid cannot readily flow especially when cold as it is at ocean bottom.

In accordance with the present invention the loading material is applied so that the turns of each layer are exactly aligned with the turns of each other layer and the spaces between the turns are also aligned forming unobstructed passages for the flow of the protecting compound. The loading material may be spaced just the same distance as in previous forms of loaded cable but the intervening spaces are continuous channels permitting ready flow of the impregnating fluid into all the interstices and spaces between successive turns and layers of the loading material and between the loading material and the conductor. After laying the cable this protecting compound flows through the various interstices relieving unequal pressure or strain on the loading material so as to insure uniform conditions throughout.

Figure 1:
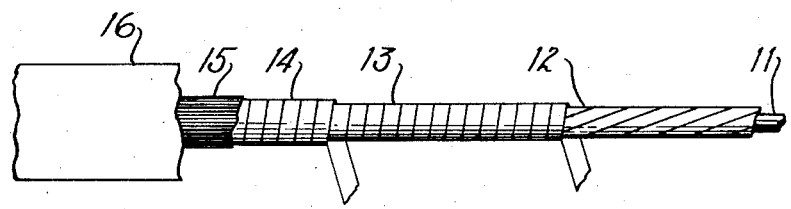
Fig. 1 illustrates a cable core loaded according to the present invention.

A conductor loaded in this manner is illustrated in Fig. 1 of the drawings in which a conducting member composed of a core 11 and conducting strands 12 is loaded with two successive layers of spirally wound magnetic tape indicated at 13 and 14. The loaded conductor is impregnated with protecting fluid as shown at 15 while the insulating coating of gutta percha is indicated at 16.

Figure 2:
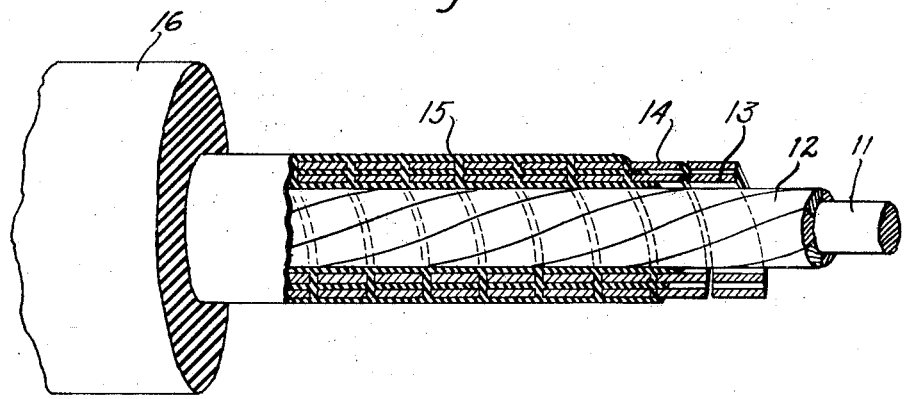
Fig. 2 is an enlarged section of such a cable core.

Fig. 2 is an enlarged sectional view more clearly showing the aligned spaces between the turns of the tape which form channels through which the protecting fluid may flow to penetrate the interstices between the conductor and the loading material and between the successive layers of loading material themselves.

This method of loading submarine cables insures uniform and complete impregnating of the conductor with the protecting fluid so that strains in the loading material due to outside pressure are reduced to a minimum.

What is claimed is:

1. An electrical conductor comprising a conducting member and a plurality of layers of loading material having interstices applied to said conductor, the corresponding interstices of all of said layers being in alignment, and the whole loaded conductor impregnated with a compound which is semi-fluid under sea bottom conditions.

2. In a submarine cable, a core comprising a conducting member and a plurality of layers of spirally wound loading material having the interstices between the turns of each layer aligned with the interstices between the turns of each other layer, and a pressure equalizing medium between said conductor and said loading material and in said interstices.

3. The method of making submarine inductively loaded conductors of the type comprising a plurality of layers of spirally wound loading material which comprises aligning interstices of each layer with interstices of each preceding layer and impregnating the whole with a pressure equalizing medium.

4. The method of making an electrical conductor comprising a conducting member and a plurality of layers of loading material surrounding said conductor which comprises placing the corresponding interstices of all said layers in alignment and completely filling all interstices of said conductor and loading material with a protecting material of a semi-fluid nature subsequent to the application of said loading material.

5. An electrical conductor comprising a conducting member and a plurality of layers of spirally wound loading material applied to said conductor so that corresponding interstices of all said layers are in alignment, and a pressure equalizing material of a semi-fluid nature filling the interstices of said conductor and loading material, and providing a hydrostatic pressure equalizing medium for said layers.

In witness whereof, I hereunto subscribe my name this 17th day of July, A. D. 1925.

OLIVER E. BUCKLEY.